US007489798B2

(12) United States Patent
Van Der Veen et al.

(10) Patent No.: US 7,489,798 B2
(45) Date of Patent: Feb. 10, 2009

(54) METHOD AND APPARATUS FOR DETECTING A WATERMARK IN A SIGNAL

(75) Inventors: Minne Van Der Veen, Eindhoven (NL); Aweke Negash Lemma, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 425 days.

(21) Appl. No.: 10/596,329

(22) PCT Filed: Nov. 24, 2004

(86) PCT No.: PCT/IB2004/052526

§ 371 (c)(1),
(2), (4) Date: Jun. 9, 2006

(87) PCT Pub. No.: WO2005/059897

PCT Pub. Date: Jun. 30, 2005

(65) Prior Publication Data

US 2007/0286450 A1 Dec. 13, 2007

(30) Foreign Application Priority Data

Dec. 11, 2003 (EP) ................................. 03104633

(51) Int. Cl.
*G06K 9/00* (2006.01)

(52) U.S. Cl. ....................... 382/100; 382/232; 382/240; 713/176; 713/179; 713/194; 386/94; 348/461; 348/463; 380/54; 726/22

(58) Field of Classification Search ................ 382/100, 382/232, 240; 380/51, 54, 201, 210, 252, 380/287; 713/176, 179; 370/522-529; 348/461, 348/463; 283/72, 74-81, 85, 93, 113, 901, 283/902; 386/94; 725/9, 20, 22; 358/3.28
See application file for complete search history.

(56) References Cited

U.S. PATENT DOCUMENTS 5,933,798 A * 8/1999 Linnartz .................... 702/191

(Continued)

FOREIGN PATENT DOCUMENTS

FR 2782223 * 2/2000

OTHER PUBLICATIONS

Aweke negash lemma et al "A temporal domain audio watermarking technique", IEEE 2003, pp. 1088-1097.*
Digital watermark for audio signal based on pdychoacoustic masking model, Nakayama et al, 2003.*

*Primary Examiner*—Samir A. Ahmed
*Assistant Examiner*—Nancy Bitar
(74) *Attorney, Agent, or Firm*—Larry Liberchuk

(57) ABSTRACT

The invention relates to a system for detecting a watermark using informed detection. A first signal potentially having a watermark embedded is received (601) as is a second signal corresponding to the original signal. The signals are segmented (605) into symbol segments. For each symbol segment a first characteristic is determined (607) for a first section and a second characteristic is determined (609) for a second section in response to the first and second signals in those sections. Specifically, ratios between average envelopes are determined. Thus, the first and second characteristic is indicative of the variations of the envelope during a watermark symbol. A watermark symbol estimate is determined (611) from the first and second characteristic. A sequence of estimated watermark symbols is compared to reference watermark symbols and the presence of a watermark symbol is determined (615) depending on the comparison. The invention is particularly suitable for improved detection of a multiplicative watermark.

13 Claims, 4 Drawing Sheets

U.S. PATENT DOCUMENTS

| | | | | |
|---|---|---|---|---|
| 6,681,029 | B1 * | 1/2004 | Rhoads | 382/100 |
| 7,043,019 | B2 * | 5/2006 | Tehranchi et al. | 382/100 |
| 7,152,021 | B2 * | 12/2006 | Alattar et al. | 702/191 |
| 7,171,017 | B2 * | 1/2007 | Keating et al. | 382/100 |
| 7,319,656 | B2 * | 1/2008 | Kobayashi et al. | 369/124.04 |
| 7,389,421 | B2 * | 6/2008 | Kirovski et al. | 713/176 |

* cited by examiner

METHOD AND APPARATUS FOR DETECTING A WATERMARK IN A SIGNAL

FIELD OF THE INVENTION

The invention relates to a method and apparatus for detecting a watermark in a signal and in particular, but not exclusively, to detecting of a multiplicative watermark.

BACKGROUND OF THE INVENTION

The illicit distribution of copyright material deprives the holder of the copyright the legitimate royalties for this material, and could provide the supplier of this illicitly distributed material with gains that encourages continued illicit distributions. In light of the ease of transfer provided by e.g. the Internet, content material that is intended to be copyright protected, such as artistic renderings or other material having limited distribution rights are susceptible to wide-scale illicit distribution.

In particular, content items such as music or video items are currently attracting a significant amount of unauthorised distribution and copying. This is partly due to the increasing practicality and feasibility of distribution and copying provided by new technologies. For example, the MP3 format for storing and transmitting compressed audio files has made a wide-scale distribution of audio recordings feasible. For instance, a 30 or 40 megabyte digital PCM (Pulse Code Modulation) audio recording of a song can be compressed into a 3 or 4 megabyte MP3 file. Using a typical 56 kbps dial-up connection to the Internet, this MP3 file can be downloaded to a user's computer in a few minutes. This may for example allow a malicious party could provide a direct dial-in service for downloading an MP3 encoded song. Moreover, the introduction of broadband internet connections stimulates the download of even bigger files such as MPEG video. The illicit copy of the MP3 encoded song can be subsequently rendered by software or hardware devices or can be decompressed and stored on a recordable CD for playback on a conventional CD player.

A number of techniques have been proposed for limiting the reproduction of copy-protected content material. The Secure Digital Music Initiative (SDMI) and others advocate the use of "digital watermarks" to prevent unauthorised copying.

Digital watermarks can be used for copy protection according to the scenarios mentioned above. However, the use of digital watermarks is not limited to copy prevention but can also be used for so-called forensic tracking, where watermarks are embedded in e.g. files distributed via an Electronic Content Delivery System, and used to track for instance illegally copied content on the Internet. Watermarks can furthermore be used for monitoring broadcast stations (e.g. commercials); or for authentication purposes etc.

Techniques have been proposed for embedding watermarks directly in a coded bit stream. This technique is frequently referred to as bitstream watermarking. Further description of bitstream watermarking may be found in PCT Patent Application WO 01/49363 A1 'Method and System of Digital Watermarking for Compressed Audio' or in 'Audio Watermarking of MPEG-2 AAC Bitsteams' by Christian Neubauer and Jurgen Herre, 108th AES Convention, Paris, Feb. 2000. Audio Engineering Society, preprint 5101.

Techniques have further been proposed for embedding watermarks directly in uncompressed signals (also referred to as a base band signal), and there are several known techniques for embedding watermarks in a raw uncompressed signal. For example a watermark may be directly embedded in a PCM (Pulse Coded Modulation) signal which may subsequently be encoded.

An example of a watermarking system for embedding a watermark in a base band signal may be found in "A temporal domain audio watermarking technique" by A. N. Lemma, J. Aprea, W. Oomen, and L. van de Kerkhof, IEEE Transactions on signal processing, Vol 51, No 4, Apr. 2003, page 1088-1097, Institute of Electrical and Electronic Engineers.

Naturally the performance and characteristics of watermark detection processes is a major factor in the success of a watermark based system. A method for detecting watermarks embedded in accordance with the above described approach comprises a two stage approach wherein individual watermark symbols are estimated in the first stage, a plurality of estimated watermark symbols are correlated with a known watermark pattern in the second stage and a detection decision is made depending on the degree of correlation. Further details of this watermark detection method may be found in "A Temporal Domain Audio Watermarking Technique" by A. N. Lemma, J. Aprea, W. Oomen, and L. van de Kerkhof, IEEE Transactions on signal processing, Vol 51, No 4, April 2003, page 1088-1097, Institute of Electrical and Electronic Engineers.

However, although such a detector is useful for watermark detection, it is sensitive to noise which may affect the performance. Noise may e.g. comprise distortions introduced by e.g. common signal processing (e.g. audio compression, dynamic amplitude compression etc) or noise introduced in a broadcast chain. Noise may cause the detector to indicate that a signal comprises a watermark although none is present or the detector may fail to detect a watermark embedded in a signal. Accordingly, it would be advantageous if improved performance and in particular improved detection accuracy could be achieved.

Furthermore, in practical implementations it is important that complexity and computational requirements of the watermark detection is minimised. However, improved performance and reliability of detection is typically achieved at the cost of increased processing and complexity.

Hence, an improved system for watermark detection would be advantageous and in particular a system allowing improved detection performance, reduced complexity and/or facilitated implementation.

SUMMARY OF THE INVENTION

Accordingly, the Invention preferably seeks to mitigate, alleviate or eliminate one or more of the above mentioned disadvantages singly or in any combination.

According to a feature of the invention, there is provided a method of detecting a watermark in a first signal, the method comprising the steps of: receiving the first signal potentially having a watermark embedded in an original signal; receiving a second signal corresponding to the original signal; segmenting the signal into a plurality of segments each corresponding to a watermark symbol; and for each of the segments performing the steps of: determining a first characteristic for a first section of the segment in response to a set of data values of the first signal in the first section and set of data values of the second signal in the first section, determining a second characteristic for a second section of the segment in response to a set of data values of the first signal in the second section and set of data values of the second signal in the second section, and determining a watermark symbol estimate for the segment in response to the first characteristic and the second characteristic; and determining if a watermark is embedded by comparison of the watermark symbol estimates with a reference watermark symbol pattern.

The inventor's of the current invention have realised that improved performance may be achieved by using informed detection of watermarks and in particular by using information of the original signal in different sections of segments corresponding to watermark symbols.

Specifically, the invention allows increased reliability of the watermark detection in the presence of noise. Furthermore, the use of information related to the original signal may be achieved without an unacceptable complexity or computational resource increase and the watermark detection is highly suitable for practical implementations.

The second signal may be received from any suitable source and may be in any suitable format for providing information related to the original signal. Specifically, the second signal may be identical or similar to all or part of the original signal. The source of the second signal may furthermore be an external or an internal source. Furthermore, the first and second signals may be received together or separately.

The comparison between the watermark symbol estimates and the reference watermark symbol pattern may specifically comprise a coffelation between the watermark symbol estimates and the reference watermark symbol pattern.

According to a feature of the invention, the step of determining the first characteristic comprises determining an envelope characteristic of the first signal in the first section.

The envelope characteristic may specifically be a sum and/or average and/or variation of the absolute amplitude values of the first signal. This may provide a particularly suitable parameter for estimating a watermark symbol. Additionally or alternatively, the second characteristic comprises determining an envelope characteristic of the first signal in the second section.

According to another feature of the invention, the step of determining the first characteristic comprises determining an envelope characteristic of the second signal in the first section.

The envelope characteristic may specifically be a sum and/or average and/or variation of the absolute amplitude values of the second signal. This may provide a particularly suitable parameter for estimating a watermark symbol. Additionally or alternatively, the second characteristic comprises determining an envelope characteristic of the first signal in the second section.

According to another feature of the invention, the step of determining the first characteristic comprises determining the first characteristic as a first relationship between an envelope characteristic of the first signal in the first section and an envelope characteristic of the second signal in the first section.

The relationship between envelope characteristics associated with the received signal and an original non-watermark embedded signal may provide a particularly advantageous indication of a watermark symbol.

According to another feature of the invention, the first relationship is a ratio. This relationship may provide particularly advantageous performance as well as acceptable resource complexity.

According to another feature of the invention, the step of determining the second characteristic comprises determining the second characteristic as a second ratio between an envelope characteristic of the first signal in the second section, and an envelope characteristic of the second signal in the second section, and the step of determining a watermark symbol estimate comprises determining the watermark symbol estimate as a mathematical function of the first ratio and the second ratio.

The relationship between ratios of envelope characteristics in different sections may for appropriate watermark symbol shapes provide particularly suitable and accurate indications of the presence of a watermark.

According to another feature of the invention, the mathematical relationship comprises a subtraction. This may provide a particularly suitable mathematical relationship for certain watermark symbol shapes, and in particular for a substantially bi-phase window symbol shape.

According to another feature of the invention, the method further comprises the step of determining a property of the first characteristic in response to a symbol shape of the watermark symbols.

Alternatively or additionally, the method comprises the step of determining a property of the second characteristic in response to a symbol shape of the watermark symbols.

For example, depending on the symbol shape of the watermark symbols, it may be advantageous to alternatively or additionally consider amplitude characteristics or energy characteristics. Thus, the watermark detection may be particularly customised for a given symbol shape.

According to another feature of the invention, the method further comprises the step of extracting a first portion of the first signal and performing the segmentation and watermark symbol estimation by processing of the first portion only. Preferably, the step of extracting the first portion comprises filtering the first signal. For example, the watermark detection may comprise band-bass filtering of the first signal. This may provide improved detection performance and in particular the extraction of the first portion may be compatible with a similar process performed in the watermark embedder.

Preferably, the watermark is a multiplicative watermark.

According to a second aspect of the invention, there is provided an apparatus for detecting a watermark in a first signal, the method comprising: means for receiving the first signal potentially having a watermark embedded in an original signal; means for receiving a second signal corresponding to the original signal; means for segmenting the signal into a plurality of segments each corresponding to a watermark symbol; and means for, for each of the segments, determining a first characteristic for a first section of the segment in response to a set of data values of the first signal in the first section and set of data values of the second signal in the first section, determining a second characteristic for a second section of the segment in response to a set of data values of the first signal in the second section and set of data values of the second signal in the second section, and determining a watermark symbol estimate for the segment in response to the first characteristic and the second characteristic; and means for determining if a watermark is embedded by comparison of the watermark symbol estimates with a reference watermark symbol pattern.

These and other aspects, features and advantages of the invention will be apparent from and elucidated with reference to the embodiment(s) described hereinafter.

BRIEF DESCRIPTION OF THE DRAWINGS

An embodiment of the invention will be described, by way of example only, with reference to the drawings, in which.

DESCRIPTION OF PREFERRED EMBODIMENTS

The following description focuses on an embodiment of the invention applicable to a detection of a multiplicative watermark but it will be appreciated that the invention is not limited to this specific application.

Initially, a system for embedding a multiplicative watermark will be described. The system is compatible with the system described in "A temporal domain audio watermarking technique" by A. N. Lemma, J. Aprea, W. Oomen, and L. van de Kerkhof, IEEE Transactions on signal processing, Vol 51, No 4, Apr. 2003, page 1088-1097, Institute of Electrical and Electronic Engineers, where further details may be found.

Figure 1:
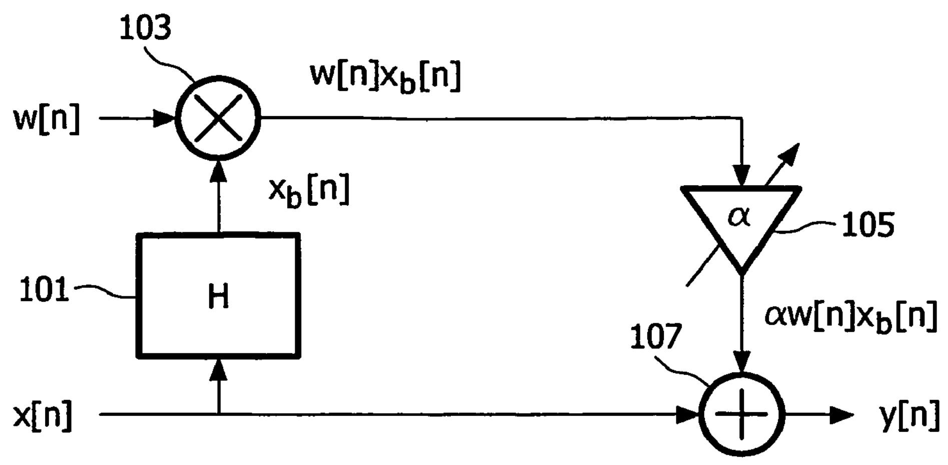
FIG. 1 illustrates a watermark embedder for embedding a multiplicative watermark in accordance with prior art.

FIG. 1 illustrates a watermark embedder for embedding a multiplicative watermark in accordance with prior art.

The watermark embedder receives samples x[n] of a base band signal to be watermarked. The samples are fed to a base band filter 101 having an impulse response h[n]. Thus, the filtered signal $x_b[n]=x[n]*h[n]$ where * denotes the convolution operation is generated. The filtered signal $x_b[n]$ is fed to a multiplier 103 where it is multiplied by watermark samples w[n] to generate the samples $x_b[n]-w[n]$ which are fed to a scaling unit 105 which scales the samples by a value α. The resulting sample values are added to the original samples x[n] in an adder 107. Thus the signal generated by the watermark embedder is:

$$y[n]=x[n]+\alpha\cdot x_b[n]-w[n]$$

Specifically, α corresponds to the embedding strength of the watermark which may be controlled dynamically by a psycho-acoustic model.

The watermark w[n] is chosen such that multiplying it with xb[n] predominantly modifies the short time envelope of xb[n].

Figure 2:
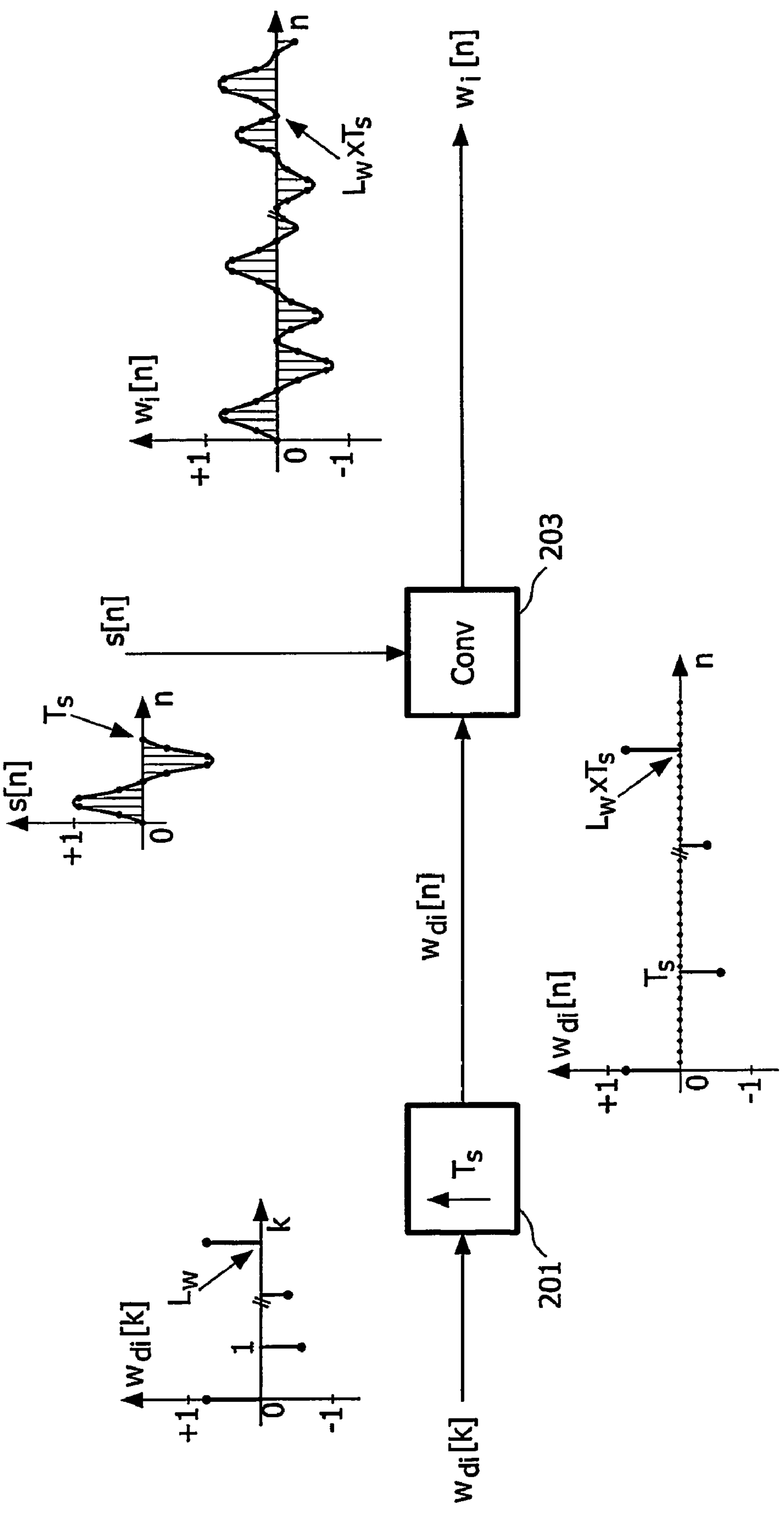
FIG. 2 illustrates a system for generating watermark samples from watermark symbols.

FIG. 2 illustrates a system for generating watermark samples from watermark symbols.

First, a finite length, zero mean, uniformly distributed random sequence $w_{di}[k]$ $$w_{di}[k]\in[-1,1] \text{ for } k=0,1, L_w-1,$$

where $L_w$ is the number of symbols in a watermark. The watermark pattern is converted into a periodic, slowly varying narrow-band signal $w_i[n]$ of length $L_w\cdot T_s$, where $T_s$ is the symbol length in samples, by the system of FIG. 2.

The watermark symbols $w_{di}[k]$ are up-sampled by a factor $T_s$ in the upsampler 201.

$$w_{di}[n]=w_{di}[n/T_s] \text{ for } n=0,T_s,2T_s$$

and 0 otherwise.

The upsampled signal is then filtered by the window shaping function s[n] in a convolution element 203:

$$w_i[n]=w_{di}[n]*s[n]$$

Thus the window shape corresponds to the symbol shape for the watermark symbol. $w_i[n]$ may then be used as the watermark samples w[n] of the watermark embedder of FIG. 1.

Figure 3:
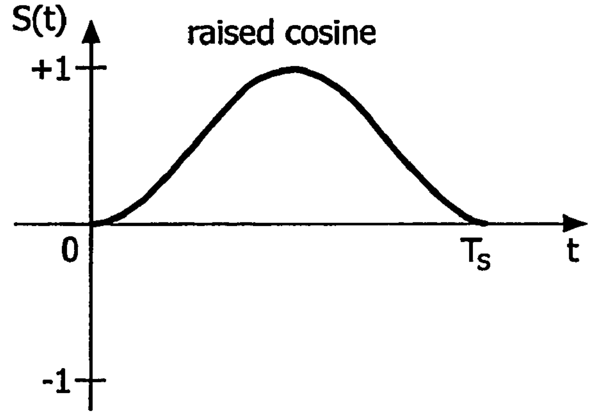
FIG. 3 illustrates a raised cosine window symbol shape suitable for the watermark embedder of FIG. 1.
Figure 4:
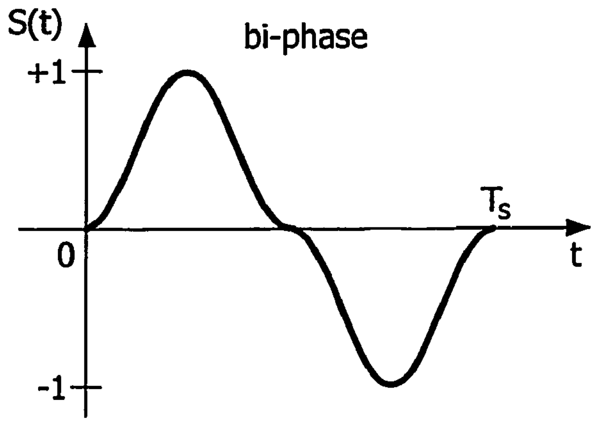
FIG. 4 illustrates a bi-phase window symbol shape suitable for the watermark embedder of FIG. 1.

The performance of the watermark system has been found to be dependent on the window shaping function and thus the watermark symbol shape. FIG. 3 illustrates a raised cosine window symbol shape suitable for the watermark embedder of FIG. 1 and FIG. 4 illustrates a bi-phase window symbol shape suitable for the watermark embedder of FIG. 1. The following description will focus on an embodiment employing the bi-phase window symbol shape but it will be appreciated that other embodiments may use other window symbol shapes.

Figure 5:
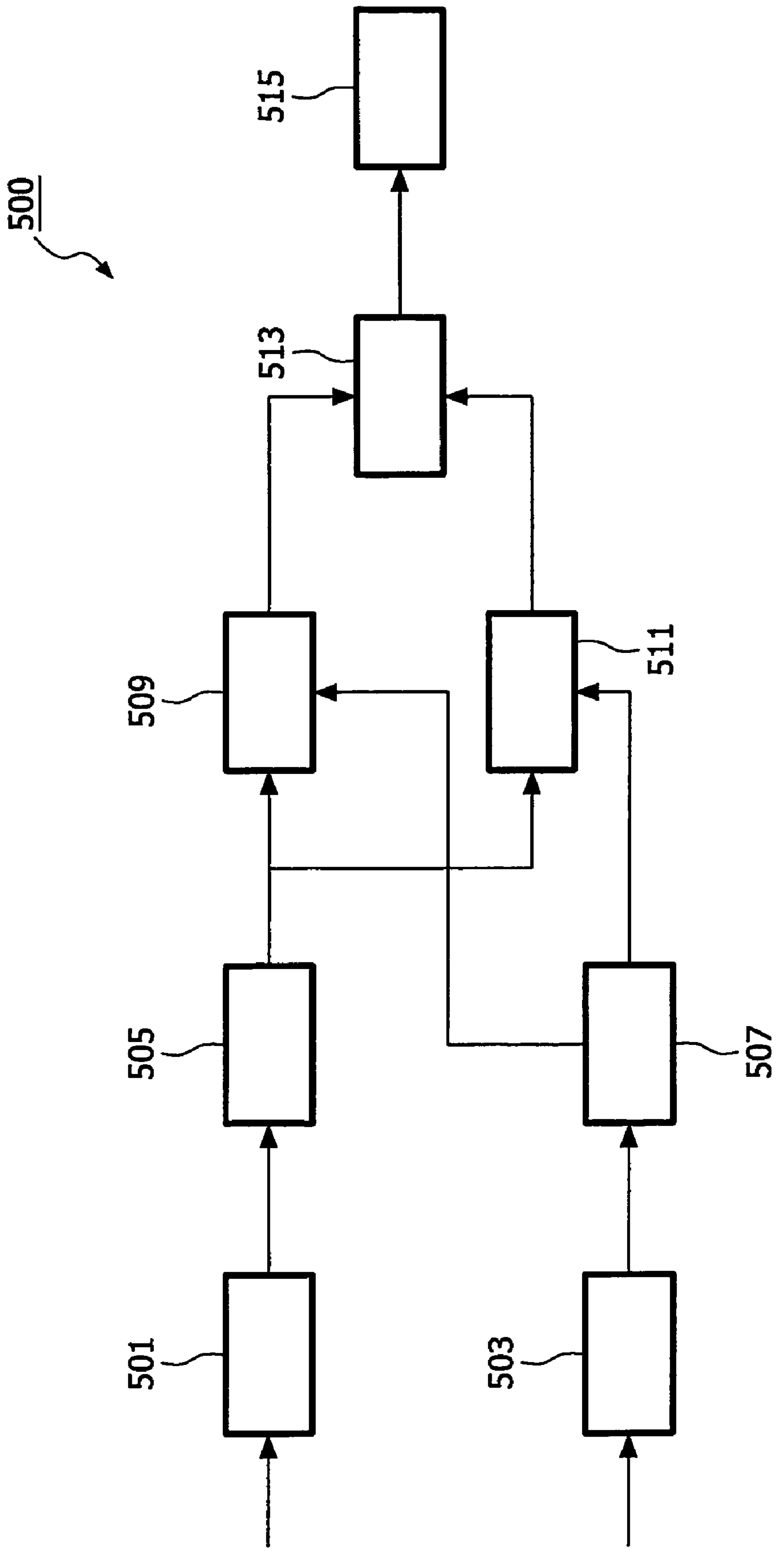
FIG. 5 illustrates a block diagram of a watermark detector in accordance with an embodiment of the invention.

FIG. 5 illustrates a block diagram of a watermark detector 500 in accordance with an embodiment of the invention.

The watermark detector 500 comprises a first receiver 501 which receives a first signal. The first signal may or may not comprise a watermark and the watermark detector 500 is arranged to detect if the first signal comprises a watermark. Specifically, the first signal may comprise a multiplicative watermark embedded into a signal as described above.

The watermark detector 500 further comprises a second receiver 503 which is operable to receive a second signal which corresponds to the original signal of the first signal before a watermark was embedded. Specifically the second signal may consist in the signal samples x[n] of the original signal.

The first receiver 501 is coupled to a first segmenter 505. In some embodiments, the first segmenter 505 comprises means for processing the first signal in order to extract a specific portion of the first signal. Specifically, if the original signal x[n] was filtered by a filter h[n] in the watermark embedder, the first segmenter 505 comprises a similar filter for extracting the same frequency range as the filter of the watermark embedder.

The first segmenter 505 is operable to divide the received signal into a plurality of segments wherein each segment corresponds to one watermark symbol. In the following, the current description will for clarity and brevity focus on an embodiment wherein the watermark embedder and the watermark detector 500 are synchronised. However, it will be appreciated that in other embodiments, the watermark detector 500 may comprise further functionality for synchronising the watermark detector 500 to the watermark embedder such that the first segmenter 505 may segment the first signal into appropriate symbol segments. Such functionality may for example be based on fingerprinting techniques as is well known in the art.

The watermark detector 500 furthermore comprises a second segmenter 507 which is coupled to the second receiver 503 and which is operable to segment the second signal in segments corresponding to watermark symbols. Thus, the first and second segmenter 505, 507 generate synchronised sample sets for each watermark symbol.

The first and second segmenter 505, 507 are coupled to a first section processor 509 which is operable to determine a first characteristic for a section or interval of each watermark symbol.

In the described embodiment, the first section processor 509 processes one watermark symbol at a time. Initially, the first section processor 509 selects a set of samples for the current watermark symbols which corresponds to a particular section of the current watermark symbol. It then proceeds to determine a first characteristic for this section in response to the data values of the first signal in the given portion as well as the data values of the second signal in the given portion. Specifically, the first section processor 509 generates a first characteristic which indicates envelope characteristics of the two signals in the first section. Thus, the first characteristic is indicative of the relative envelope characteristics of the potentially watermarked signal and the original signal in a specific interval of the watermark symbol period.

Similarly, the first and second segmenter 505, 507 are coupled to a second section processor 511 which is operable to determine a second characteristic related to a different second section or interval of each watermark symbol.

In the described embodiment, the second section processor 511 also processes one watermark symbol at a time. Similarly to the first section processor 509, the second section processor 511 also selects a set of samples for the current watermark symbols which corresponds to a particular (but different) section of the current watermark symbol. It then proceeds to determine the second characteristic for this section in response to the data values of the first signal in the given portion as well as the data values of the second signal in the given portion. Specifically, the second section processor 511 generates a second characteristic which indicates envelope characteristics of the two signals in the second section. Thus, the second characteristic is indicative of the relative envelope characteristics of the potentially watermarked signal and the original signal in a specific interval of the watermark symbol period.

Specifically, in the described embodiment, the first and second section processor 509, 511 performs the same processing but on different sections of the watermark symbol. Thus, the first and second characteristics are indicative of how a given parameter (or combination of parameters) may vary in different sections of the watermark symbol. Thus, depending on the watermark symbol shape, the first and second characteristic may be assumed to vary in a certain way if a watermark is present but not if no watermark is present. By determining the first and second characteristic in response to known parameters of the original signal a more reliable and predictable variation may be expected.

The first and second section processors 509, 511 are coupled to a watermark symbol estimator 513 and feed the first and second characteristic to this. The watermark symbol estimator 513 estimates the current watermark symbol in response to the first and second characteristic. The process is repeated for a plurality of watermark symbols and these are fed to a decision unit 515.

The decision unit 515 is operable to compare the watermark symbol estimates to a reference watermark symbol pattern. Specifically, the watermark symbol estimates are correlated with the reference watermark symbol pattern and if the correlation is sufficiently high, the decision unit 515 determines that a watermark is embedded in the first signal and otherwise it is determined that a watermark is not embedded.

Figure 6:
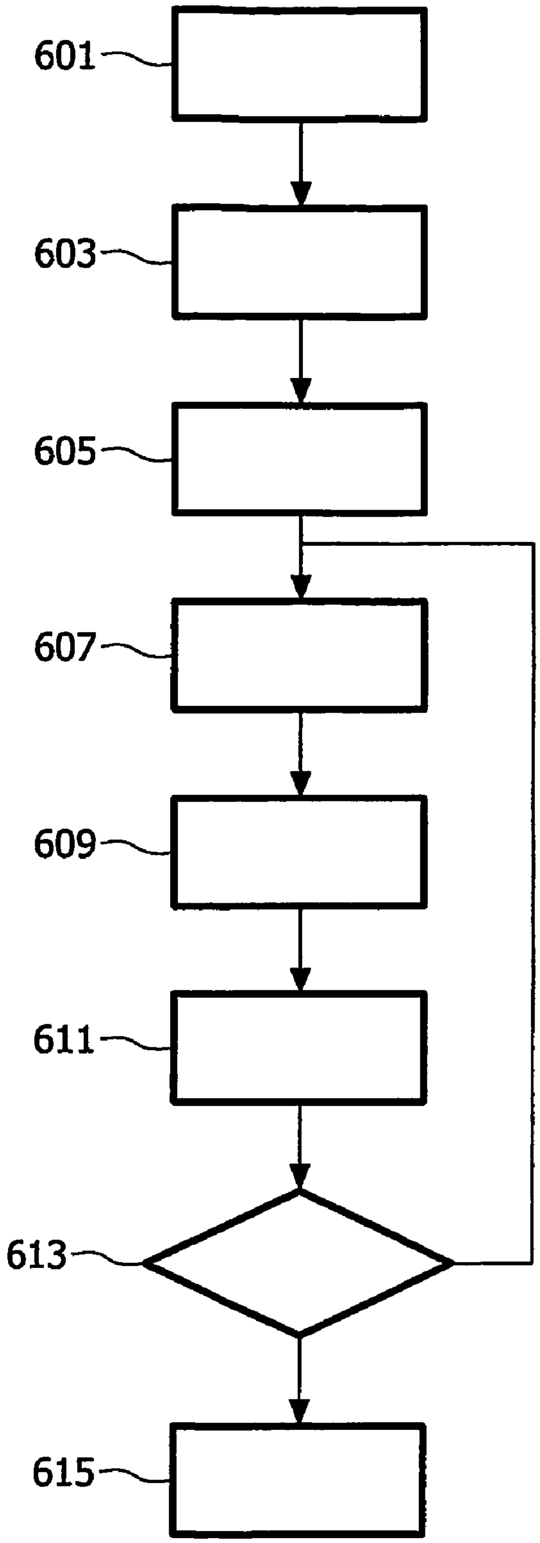
FIG. 6 illustrates a method of detecting a watermark in accordance with an embodiment of the invention.

FIG. 6 illustrates a method of detecting a watermark in accordance with an embodiment of the invention. The method is applicable to the watermark detector of FIG. 5 and will be described with reference to a specific embodiment using envelope characteristics. The method will further be described with reference to a signal potentially having a watermark embedded by the method described with reference to the watermark embedder of FIG. 1.

In step 601 the first signal potentially comprising a watermark is received. The first signal is filtered by a filter $h_b$ to generate the filtered signal $y_b[n]$. The filter $h_b$ corresponds to the filter h of the watermark embedder 100 and is specifically a bandpass filter having the same frequency response as h. Thus, $h_b$ simply extracts the same frequency band as was used for watermark embedding. Thus $$y_b[n] \cong y[n] = (1+\alpha\cdot w[n])\cdot x_b[n]$$

In step 603, a second signal is received, possibly from an internal source, which corresponds to the original signal x[n] before watermarking.

Step 603 is followed by step 605 wherein the (filtered) first and second signals are segmented into individual segments corresponding to a watermark symbol. Thus, after filtering, the first signal is segmented into frames of length $T_s$. Denoting the frame number by k and letting $w_k[n]=w_{di}[k]s[n]$ be the n-th sample of the watermark signal for watermark symbol $w_{di}[k]$, the watermarked signal in segment k is given by $$y_{b,k}[n] = (1+\alpha\cdot w_{di}[k]s[n])\cdot x_{b,k}[n]$$

where s[n] is the bi-phase window shaping function of FIG. 4 and $w_{di}[k]$ is an estimate of the k-th watermark symbol of the embedded watermark sequence.

In a further step it is tried to estimate $w_{di}[k]$ given the known signal $y_{b,k}[n]$.

The following envelope values may be determined from the first half and second half of the segment corresponding to watermark symbol k:

$$\sum_{n=0}^{T_s/2-1} |y_{b,k}[n]| = \sum_{n=0}^{T_s/2-1} |(1+\alpha w_{di}[k]s[n])x_{b,k}[n]|$$

$$\sum_{n=T_s/2}^{T_s-1} |y_{b,k}[n]| = \sum_{n=T_s/2}^{T_s-1} |(1+\alpha w_{di}[k]s[n])x_{b,k}[n]|$$

A rough approximation of the bi-phase window of FIG. 4 may be given by $$s[n] = \begin{cases} 0 & \text{for } 0 \leqq n < T_s/6 \\ 1 & \text{for } T_s/6 \leqq n < 2T_s/6-1 \\ & \text{for } 2T_s/6-1 \leqq n < 4T_s/6-1 \\ -1 & \text{for } 4T_s/6-1 \leqq n < 5T_s/6-1 \\ 0 & \text{for } 5T_s/6-1 \leqq n < T_s-1 \end{cases}$$

Inserting this approximation yields the following approximation:

$$\sum_{n=T_s/6}^{2T_s/6-1} |y_{b,k}[n]| = (1+\alpha w_{di}[k]) \sum_{n=T_s/6}^{2T_s/6-1} |x_{b,k}[n]|$$

$$\sum_{n=4T_s/6}^{5T_s/6-1} |y_{b,k}[n]| = (1-\alpha w_{di}[k]) \sum_{n=4T_s/6}^{5T_s/6-1} |x_{b,k}[n]|$$

Note that if $|\alpha\cdot w[k]| \leqq 1$ the only approximation is that of the approximation of s[n]. Since both $y_{b,k}[n]$ (i.e. band-pass filtered watermark signal) and $x_{b,k}[n]$ (i.e. band-pass filtered host signal) are known, the watermark signal $w_{di}[k]$ can be derived from:

$$w_{di}[k] = \frac{1}{2\alpha}\left(\frac{\sum_{n=T_s/6}^{2T_s/6-1} |y_{b,k}[n]|}{\sum_{n=T_s/6}^{2T_s/6-1} |x_{b,k}[n]|} - \frac{\sum_{n=4T_s/6}^{5T_s/6-1} |y_{b,k}[n]|}{\sum_{n=4T_s/6}^{5T_s/6-1} |x_{b,k}[n]|}\right)$$

In the described embodiment, the above approach is used for determining the watermark symbol estimates.

Specifically step 605 is followed by step 607 wherein samples from $T_s/6 \leqq n < 2T_s/6-1$ are processed to determine a first characteristic given by:

$$c_1 = \frac{\sum_{n=T_s/6}^{2T_s/6-1} |y_{b,k}[n]|}{\sum_{n=T_s/6}^{2T_s/6-1} |x_{b,k}[n]|}$$

Thus, step 607 comprises determining the first characteristic as an envelope characteristic of the first and second signal.

Step 607 is followed by step 609 wherein samples from $4T_s/6-1 \leqq n < 5T_s/6-1$ are processed to determine a second characteristic given by:

$$c_2 = \frac{\sum_{n=4T_s/6}^{5T_s/6-1} |y_{b,k}[n]|}{\sum_{n=4T_s/6}^{5T_s/6-1} |x_{b,k}[n]|}$$

Thus, step 609 comprises determining the second characteristic as an envelope characteristic of the first and second signal.

Step 609 is followed by step 611 wherein the watermark symbol is estimated from the first and second characteristic as:

$$w_{dl}[k] = \frac{1}{2\alpha}(c_1 - c_2)$$

Step 611 is followed by step 613 wherein it is determined if all watermark symbols of the watermark sequence have been estimated. If not, the method returns to step 607. Otherwise, the method continues in step 615 where the estimated watermark symbol sequence is correlated with a reference watermark symbol pattern. If the correlation is above a threshold, it is decided that the first signal comprises a watermark, and if it is below the threshold it is decided that the first signal does not comprise a watermark.

Thus, the described embodiment provides a system for detecting a watermark which has high performance and which in particular has high watermark detection reliability. Furthermore, the method is particularly suited for implementation in a firmware or software processing unit and may be implemented with relatively low complexity.

The exact parameters and characteristics used for estimating the watermark symbols may depend on the exact symbol shape of the watermark symbols. Accordingly, a property of the first characteristic and/or second characteristic may be determined in response to the symbol shape of the watermark symbols. For example, different formulas and equations may be determined for different symbol shapes and depending on the specific symbol shape used, the operation may be modified.

The invention can be implemented in any suitable form including hardware, software, firmware or any combination of these. However, preferably, the invention is implemented as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with the preferred embodiment, it is not intended to be limited to the specific form set forth herein. Rather, the scope of the present invention is limited only by the accompanying claims. In the claims, the term comprising does not exclude the presence of other elements or steps. Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is no feasible and/or advantageous. In addition, singular references do not exclude a plurality. Thus references to "a", "an", "first", "second" etc do not preclude a plurality.

The invention claimed is:

1. A method of detecting a watermark in a first signal, the method comprising the steps of:

receiving (601) the first signal potentially having a watermark embedded in an original signal;

receiving (603) a second signal corresponding to the original signal; segmenting (605) the signal into a plurality of segments each corresponding to a watermark symbol;

and for each of the segments performing the steps of:

determining (607) a first characteristic for a first section of the segment in response to a set of data values of the first signal in the first section and set of data values of the second signal in the first section, determining (609) a second characteristic for a second section of the segment in response to a set of data values of the first signal in the second section and set of data values of the second signal in the second section, and determining (611) a watermark symbol estimate for the segment in response to the first characteristic and the second characteristic; and determining (615) if a watermark is embedded by comparison of the watermark symbol estimates with a reference watermark symbol pattern.

2. A method as claimed in claim 1 wherein the step of determining (607) the first characteristic comprises determining an envelope characteristic of the first signal in the first section.

3. A method as claimed in claim 1 wherein the step of determining (607) the first characteristic comprises determining an envelope characteristic of the second signal in the first section.

4. A method as claimed in claim 1 wherein the step of determining (607) the first characteristic comprises determining the first characteristic as a first relationship between an envelope characteristic of the first signal in the first section and an envelope characteristic of the second signal in the first section.

5. A method as claimed in claim 4 wherein the first relationship is a ratio.

6. A method as claimed in claim 5 wherein the step of determining (609) the second characteristic comprises determining the second characteristic as a second ratio between an envelope characteristic of the first signal in the second section and an envelope characteristic of the second signal in the second section and the step (615) of determining a watermark symbol estimate comprises determining the watermark symbol estimate as a mathematical function of the first ratio and the second ratio.

7. A method as claimed in claim 6 wherein the mathematical relationship comprises a subtraction.

8. A method as claimed in claim 1 wherein a symbol shape of the watermark symbols is a substantially bi-phase window symbol shape.

9. A method as claimed in claim 1 further comprising the step of determining a property of the first characteristic in response to a symbol shape of the watermark symbols.

10. A method as claimed in claim 1 further comprising the step of extracting a first portion of the first signal and performing the segmentation and watermark symbol estimation by processing of the first portion only.

11. A method as claimed in claim 1 wherein the step of extracting the first portion comprises filtering the first signal.

12. A method as claimed in claim 1 wherein the watermark is a multiplicative watermark.

13. An apparatus for detecting a watermark in a first signal, the method comprising:

means (501) for receiving the first signal potentially having a watermark embedded in an original signal;

means (503) for receiving a second signal corresponding to the original signal;

means (505, 507) for segmenting the signal into a plurality of segments each corresponding to a watermark symbol;

and means (509, 511, 513) for, for each of the segments, determining a first characteristic for a first section of the segment in response to a set of data values of the first signal in the first section and set of data values of the second signal in the first section, determining a second characteristic for a second section of the segment in response to a set of data values of the first signal in the second section and set of data values of the second signal in the second section, and determining a watermark symbol estimate for the segment in response to the first characteristic and the second characteristic; and means (515) for determining if a watermark is embedded by comparison of the watermark symbol estimates with a reference watermark symbol pattern.

* * * * *